(12) United States Patent
Sirpal

(10) Patent No.: US 11,068,124 B2
(45) Date of Patent: Jul. 20, 2021

(54) GESTURE CONTROLLED SCREEN REPOSITIONING FOR ONE OR MORE DISPLAYS

(71) Applicant: Z124, George Town (KY)

(72) Inventor: Sanjiv Sirpal, Oakville (CA)

(73) Assignee: Z124, George Town (KY)

( * ) Notice: Subject to any disclaimer, the term of this patent is extended or adjusted under 35 U.S.C. 154(b) by 0 days.

(21) Appl. No.: 16/580,795

(22) Filed: Sep. 24, 2019

(65) Prior Publication Data
US 2020/0089392 A1   Mar. 19, 2020

Related U.S. Application Data

(63) Continuation of application No. 14/819,712, filed on Aug. 6, 2015, now abandoned, which is a
(Continued)

(51) Int. Cl.
*G06F 3/0488* (2013.01)
*G06F 3/0481* (2013.01)
(Continued)

(52) U.S. Cl.
CPC ........ *G06F 3/04817* (2013.01); *G06F 1/1647* (2013.01); *G06F 3/017* (2013.01);
(Continued)

(58) Field of Classification Search
CPC .... G06F 3/0481; G06F 3/0482; G06F 3/0483; G06F 1/1647; G06F 3/0412; G06F 3/017;
(Continued)

(56) References Cited

U.S. PATENT DOCUMENTS 5,252,951 A   10/1993   Tannenbaum et al.
5,900,848 A   5/1999   Haneda et al.
(Continued)

FOREIGN PATENT DOCUMENTS

CN   2662553   12/2004
CN   1573648   2/2005
(Continued)

OTHER PUBLICATIONS

U.S. Appl. No. 16/549,819, filed Aug. 23, 2019, Schrock.
(Continued)

*Primary Examiner* — Arpan P. Savla
*Assistant Examiner* — Erik V Stitt
(74) *Attorney, Agent, or Firm* — Sheridan Ross P.C.

(57) ABSTRACT

Control of a computing device using gesture inputs. The computing device may be a handheld computing device with a plurality of displays. The displays may be capable of displaying a graphical user interface (GUI). The plurality of displays may be modified in response to receipt of a gesture input such that the displays are changed from a first state to a second state. The change of the displays from the first state to the second state may include moving a GUI from a first display to a second display. Additionally, a second GUI may be moved from the second display to the first display. The gesture input may comprise multiple touches, such as a pinch gesture.

22 Claims, 12 Drawing Sheets

Related U.S. Application Data continuation of application No. 12/948,675, filed on Nov. 17, 2010, now abandoned.

(60) Provisional application No. 61/389,000, filed on Oct. 1, 2010, provisional application No. 61/389,117, filed on Oct. 1, 2010, provisional application No. 61/389,087, filed on Oct. 1, 2010.

(51) Int. Cl.

| | | |
|---|---|---|
| *G06F 1/16* | (2006.01) | |
| *G06F 3/01* | (2006.01) | |
| *G06F 3/041* | (2006.01) | |
| *G06F 3/0482* | (2013.01) | |
| *G06F 3/0484* | (2013.01) | |
| *G06F 3/14* | (2006.01) | |
| *G06F 3/0483* | (2013.01) | |
| *G06F 3/0486* | (2013.01) | |

(52) U.S. Cl.
CPC .......... *G06F 3/0412* (2013.01); *G06F 3/0416* (2013.01); *G06F 3/0481* (2013.01); *G06F 3/0482* (2013.01); *G06F 3/0483* (2013.01); *G06F 3/0486* (2013.01); *G06F 3/0488* (2013.01); *G06F 3/04842* (2013.01); *G06F 3/04845* (2013.01); *G06F 3/04847* (2013.01); *G06F 3/04883* (2013.01); *G06F 3/04886* (2013.01); *G06F 3/1423* (2013.01); *G06F 1/1616* (2013.01); *G06F 1/1641* (2013.01)

(58) Field of Classification Search
CPC ............. G06F 3/04847; G06F 3/04842; G06F 3/0488; G06F 3/04883; G06F 3/1423; G06F 1/1641; G06F 3/0486; G06F 3/04845; G06F 1/1616; G06F 3/04817; G06F 4/0416; G05F 1/1616
See application file for complete search history.

(56) References Cited

U.S. PATENT DOCUMENTS

| | | | |
|---|---|---|---|
| 6,243,645 B1 | 6/2001 | Moteki et al. | |
| 6,331,840 B1 | 12/2001 | Nielson et al. | |
| 6,385,331 B2 | 5/2002 | Harakawa et al. | |
| 6,545,669 B1 | 4/2003 | Kinawi et al. | |
| 6,573,883 B1 | 6/2003 | Bartlett | |
| 6,788,292 B1 | 9/2004 | Nako et al. | |
| 6,861,946 B2 | 3/2005 | Verplaetse et al. | |
| 6,977,643 B2 | 12/2005 | Wilbrink et al. | |
| 7,479,949 B2 * | 1/2009 | Jobs .................. | H04M 1/72522 345/173 |
| 7,840,912 B2 | 11/2010 | Elias et al. | |
| 7,870,496 B1 | 1/2011 | Sherwani | |
| 7,917,584 B2 | 3/2011 | Arthursson | |
| 7,936,341 B2 | 5/2011 | Weiss | |
| 7,938,721 B2 | 5/2011 | Miyamoto et al. | |
| 8,171,427 B2 | 5/2012 | Chung et al. | |
| 8,194,043 B2 | 6/2012 | Cheon et al. | |
| 8,291,344 B2 | 10/2012 | Chaudhri | |
| 8,504,936 B2 | 8/2013 | Gimpl et al. | |
| 8,527,892 B2 | 9/2013 | Sirpal et al. | |
| 8,599,106 B2 | 12/2013 | Gimpl et al. | |
| 8,599,151 B2 | 12/2013 | Narita | |
| 8,648,825 B2 | 2/2014 | Sirpal et al. | |
| 8,650,508 B2 | 2/2014 | Lim | |
| 8,704,781 B2 | 4/2014 | Kii | |
| 8,739,053 B2 | 5/2014 | Chen et al. | |
| 8,762,896 B2 | 6/2014 | Lee et al. | |
| 8,786,559 B2 | 7/2014 | Hogan | |
| 8,793,608 B2 | 7/2014 | Sirpal et al. | |
| 8,810,533 B2 | 8/2014 | Chen | |
| 8,856,688 B2 | 10/2014 | Tseng | |
| 8,924,892 B2 * | 12/2014 | Roth ..................... | G06F 3/0488 715/863 |
| 9,019,214 B2 | 4/2015 | Sirpal | |
| 9,026,923 B2 | 5/2015 | Sirpal et al. | |
| 9,046,992 B2 | 6/2015 | Sirpal | |
| 9,052,801 B2 | 6/2015 | Sirpal et al. | |
| 9,075,558 B2 | 7/2015 | Reeves et al. | |
| 9,182,884 B2 | 11/2015 | Westerman et al. | |
| 9,372,618 B2 | 6/2016 | Sirpal et al. | |
| 9,542,004 B1 * | 1/2017 | Hu ..................... | G06F 3/04883 |
| 2002/0075289 A1 | 6/2002 | Hatori et al. | |
| 2003/0179243 A1 | 9/2003 | Numano | |
| 2003/0182597 A1 | 9/2003 | Coha et al. | |
| 2003/0189597 A1 | 10/2003 | Anderson et al. | |
| 2004/0172279 A1 | 9/2004 | Carolan et al. | |
| 2005/0012723 A1 | 1/2005 | Pallakoff | |
| 2005/0030255 A1 | 2/2005 | Chiu et al. | |
| 2005/0212767 A1 | 9/2005 | Marvit et al. | |
| 2006/0161868 A1 | 7/2006 | Van Dok et al. | |
| 2006/0206825 A1 | 9/2006 | Karlheinz et al. | |
| 2006/0227106 A1 | 10/2006 | Hashimoto et al. | |
| 2007/0046643 A1 | 3/2007 | Hillis et al. | |
| 2007/0064004 A1 | 3/2007 | Bonner et al. | |
| 2007/0085759 A1 | 4/2007 | Lee et al. | |
| 2007/0124503 A1 | 5/2007 | Ramos et al. | |
| 2007/0192749 A1 | 8/2007 | Baudisch | |
| 2007/0262964 A1 | 11/2007 | Zotov et al. | |
| 2008/0062625 A1 | 3/2008 | Batio | |
| 2008/0152263 A1 | 6/2008 | Harrison | |
| 2008/0165141 A1 | 7/2008 | Christie | |
| 2008/0168290 A1 | 7/2008 | Jobs et al. | |
| 2008/0209358 A1 | 8/2008 | Yamashita | |
| 2008/0242359 A1 | 10/2008 | Seol et al. | |
| 2009/0006292 A1 | 1/2009 | Block | |
| 2009/0027354 A1 | 1/2009 | Perski et al. | |
| 2009/0073194 A1 | 3/2009 | Ording | |
| 2009/0102744 A1 | 4/2009 | Ram | |
| 2009/0178008 A1 * | 7/2009 | Herz ..................... | G06F 3/0483 715/840 |
| 2009/0204925 A1 | 8/2009 | Bhat et al. | |
| 2009/0209350 A1 | 8/2009 | Kelly et al. | |
| 2009/0213081 A1 | 8/2009 | Case, Jr. | |
| 2009/0259967 A1 | 10/2009 | Davidson et al. | |
| 2009/0278806 A1 | 11/2009 | Duarte et al. | |
| 2009/0289874 A1 | 11/2009 | Ha | |
| 2009/0298537 A1 | 12/2009 | Choi | |
| 2009/0303187 A1 | 12/2009 | Paliakoff | |
| 2009/0303231 A1 | 12/2009 | Robinet et al. | |
| 2010/0020025 A1 | 1/2010 | Lemort et al. | |
| 2010/0031186 A1 | 2/2010 | Tseng et al. | |
| 2010/0031202 A1 | 2/2010 | Morris et al. | |
| 2010/0064244 A1 | 3/2010 | Kilpatrick, II et al. | |
| 2010/0064536 A1 | 3/2010 | Caskey et al. | |
| 2010/0079498 A1 * | 4/2010 | Zaman ................ | G06F 3/04883 345/661 |
| 2010/0081475 A1 | 4/2010 | Chiang et al. | |
| 2010/0083154 A1 | 4/2010 | Takeshita | |
| 2010/0115473 A1 | 5/2010 | Reeves et al. | |
| 2010/0146464 A1 | 6/2010 | Wilson et al. | |
| 2010/0156836 A1 | 6/2010 | Katayama | |
| 2010/0162128 A1 | 6/2010 | Richardson et al. | |
| 2010/0175018 A1 | 7/2010 | Petschnigg et al. | |
| 2010/0180297 A1 | 7/2010 | Levine et al. | |
| 2010/0182247 A1 | 7/2010 | Petschnigg et al. | |
| 2010/0188352 A1 | 7/2010 | Ikeda | |
| 2010/0211872 A1 | 8/2010 | Rolston et al. | |
| 2010/0211920 A1 | 8/2010 | Westerman et al. | |
| 2010/0214237 A1 | 8/2010 | Echeverri et al. | |
| 2010/0227650 A1 | 9/2010 | Kim et al. | |
| 2010/0231536 A1 | 9/2010 | Chaudhri et al. | |
| 2010/0245209 A1 | 9/2010 | Miller et al. | |
| 2010/0245256 A1 | 9/2010 | Estrada et al. | |
| 2010/0248788 A1 | 9/2010 | Yook et al. | |
| 2010/0287513 A1 | 11/2010 | Singh et al. | |
| 2010/0295781 A1 | 11/2010 | Alameh et al. | |
| 2010/0298032 A1 | 11/2010 | Lee et al. | |
| 2010/0321319 A1 | 12/2010 | Hefti | |
| 2010/0333011 A1 | 12/2010 | Kornev et al. | |
| 2011/0006971 A1 | 1/2011 | Ebey et al. | |

(56) References Cited

U.S. PATENT DOCUMENTS

| | | |
|---|---|---|
| 2011/0018821 A1 | 1/2011 | Kii |
| 2011/0025601 A1 | 2/2011 | Wilson et al. |
| 2011/0039603 A1 | 2/2011 | Kim et al. |
| 2011/0047459 A1 | 2/2011 | Van Der Westhuizen |
| 2011/0066984 A1 | 3/2011 | Li |
| 2011/0069021 A1 | 3/2011 | Hill |
| 2011/0074696 A1 | 3/2011 | Rapp et al. |
| 2011/0074710 A1 | 3/2011 | Weeldreyer et al. |
| 2011/0078624 A1 | 3/2011 | Missig et al. |
| 2011/0081889 A1 | 4/2011 | Gao et al. |
| 2011/0090255 A1 | 4/2011 | Wilson et al. |
| 2011/0107272 A1* | 5/2011 | Aguilar ............... G06F 3/04883 715/853 |
| 2011/0125398 A1 | 5/2011 | Bos |
| 2011/0145768 A1 | 6/2011 | Leffert et al. |
| 2011/0209058 A1 | 8/2011 | Hinckley et al. |
| 2011/0209097 A1 | 8/2011 | Hinckley et al. |
| 2011/0209099 A1 | 8/2011 | Hinckley et al. |
| 2011/0209100 A1* | 8/2011 | Hinckley ............... G06F 1/1698 715/863 |
| 2011/0209101 A1 | 8/2011 | Hinckley et al. |
| 2011/0209102 A1 | 8/2011 | Hinckley et al. |
| 2011/0209104 A1 | 8/2011 | Hinckley et al. |
| 2011/0221678 A1 | 9/2011 | Davydov |
| 2011/0228463 A1 | 9/2011 | Matagne |
| 2011/0237303 A1 | 9/2011 | Matsuda |
| 2011/0242138 A1 | 10/2011 | Tribble |
| 2011/0260997 A1 | 10/2011 | Ozaki |
| 2011/0265021 A1 | 10/2011 | Chien et al. |
| 2011/0283212 A1 | 11/2011 | Warner |
| 2011/0285631 A1 | 11/2011 | Imamura et al. |
| 2011/0291964 A1 | 12/2011 | Chambers et al. |
| 2012/0050779 A1 | 3/2012 | Tani et al. |
| 2012/0056817 A1 | 3/2012 | Griffin et al. |
| 2012/0081293 A1 | 4/2012 | Sirpal et al. |
| 2012/0081306 A1 | 4/2012 | Sirpal et al. |
| 2012/0081310 A1 | 4/2012 | Schrock |
| 2012/0084678 A1 | 4/2012 | Sirpal et al. |
| 2012/0084679 A1 | 4/2012 | Sirpal et al. |
| 2012/0084680 A1 | 4/2012 | Gimpl et al. |
| 2012/0084700 A1 | 4/2012 | Sirpal et al. |
| 2012/0084725 A1 | 4/2012 | Sirpal et al. |
| 2012/0084736 A1 | 4/2012 | Sirpal |
| 2012/0084737 A1 | 4/2012 | Gimpl et al. |
| 2012/0242599 A1 | 9/2012 | Seo et al. |
| 2013/0097532 A1 | 4/2013 | Reeves et al. |
| 2015/0020021 A1 | 1/2015 | Marr et al. |
| 2015/0169119 A1* | 6/2015 | Kornmann .......... G06F 3/04815 345/173 |
| 2016/0034176 A1 | 2/2016 | Sirpal |
| 2016/0062554 A1 | 3/2016 | Sirpal et al. |
| 2016/0062593 A1 | 3/2016 | Schrock |
| 2016/0179367 A1 | 6/2016 | Gimpl et al. |

FOREIGN PATENT DOCUMENTS

| | | |
|---|---|---|
| CN | 1933883 | 3/2007 |
| CN | 1941974 | 4/2007 |
| CN | 1949065 | 4/2007 |
| CN | 101038737 | 9/2007 |
| CN | 101276253 | 10/2008 |
| CN | 101354639 | 1/2009 |
| CN | 101655753 | 2/2010 |
| CN | 101661383 | 3/2010 |
| CN | 101676853 | 3/2010 |
| CN | 101727268 | 6/2010 |
| CN | 102084325 | 6/2011 |
| CN | 102150096 | 8/2011 |
| DE | 19739284 | 3/1999 |
| EP | 1729204 | 12/2006 |
| EP | 2166437 | 3/2010 |
| EP | 2169949 | 3/2010 |
| EP | 2214088 | 8/2010 |
| EP | 2226713 | 9/2010 |
| EP | 2309368 | 4/2011 |
| EP | 2309369 | 4/2011 |
| JP | H09-305262 | 11/1997 |
| JP | H11-242539 | 9/1999 |
| JP | 2002-259001 | 9/2002 |
| JP | 2003-280622 | 10/2003 |
| JP | 2005-284886 | 10/2005 |
| JP | 2007-109240 | 4/2007 |
| JP | 2009-211547 | 9/2009 |
| JP | 2010-015239 | 1/2010 |
| JP | 2010-039636 | 2/2010 |
| JP | 2010-92340 | 4/2010 |
| JP | 2010-134039 | 6/2010 |
| JP | 2010-160581 | 7/2010 |
| JP | 2010-211400 | 9/2010 |
| WO | WO 2005/119404 | 12/2005 |
| WO | WO 2009/067224 | 5/2009 |
| WO | WO 2009/137419 | 11/2009 |
| WO | WO 2010/001699 | 1/2010 |
| WO | WO 2010/010835 | 1/2010 |
| WO | WO 2010/028405 | 3/2010 |
| WO | WO 2010/028406 | 3/2010 |
| WO | WO 2010/111391 | 9/2010 |

OTHER PUBLICATIONS

"Connect the Brix Phones together for a Larger Media Screen," 2014, retrieved Jul. 13, 2014 from http://walyou.com/connect-the-brix-phones-together-for-a-larger-media-screen/, 5 pages.

"Lapdock™ for Motorola Atrix," at http://www.motorola.com/Consumers/US-EN/Consumer-Product-and-Services/Mobile . . . , accessed Apr. 18, 2011, 1 page.

"Microsoft Patents Dual-Screen Phone From the Future (Video & Pies)," retrieved Jul. 13, 2014 from www.wp7connect.com/2011/07/09/microsoft-patents-dual-screen-phone-from-the-future-video-pics/, 2 pages.

"Motorola Atrix 4G Laptop Dock Review," at http://www.phonearena.com/reviews/Motorola-ATRIX-4G-Laptop-Dock-Review_id2667, Mar. 2, 2011, 6 pages.

"Palm Pre employing HTML5 equips multi-task operation," (English translated title) Nikkei Business Publications, Inc., Aug. 10, 2009, vol. 1010, pp. 38-43.

Website entitled, "Kyocera Echo," at www.echobykyocera.com/, 2011, 6 pages.

Website entitled, "Sony Tablet," at store.sony.com/webapp/wcs/stores/servlet/CategoryDisplay?catalogId=10551&storeId=10151&langId=-1&categoryId=8198552921644795521, 2011, 3 pages.

Bretzner et al., "Hand Gesture Recognition using Multi-Scale Colour Features, Hierarchical Models and Particle Filtering," Proceedings Fifth IEEE Conference on Automatic Face and Gesture Recognition, 2002, pp. 1-6.

Burns, C., "Motorola Atrix 4G Laptop Dock Review," at http://androidcommunity.com/motorola-atrix-4g-laptop-dock-review-20110220/, Feb. 20, 2011, 5 pages.

Google images, accessed Apr. 18, 2011, 6 pages.

Catacchio, Chad, "This smartphone has two huge screens . . . that rotate," The Next Web at http://thenextweb.com/asia/2010/10/07/this-smartphone-has-two-huge-screens-that-rotate/, Jul. 21, 2011, 2 pages.

Harman03, "Kyocera Echo Dual-screen Android Phone," posted 4 weeks from Apr. 18, 2011, 3 pages.

Hinckley et al., "Stitching: Pen Gestures that Span Multiple Displays," Proc. of the Working Conference on Advanced Visual Interfaces, Jan. 1, 2004, pp. 23-31.

Stein, S., "How does the Motorola Atrix 4G Lapdock compare with a laptop?" Crave—CNET, at http://news.cnet.com/8301-17938_105-20031251-1.html, Feb. 9, 2011, 7 pages.

Webb, "Samsung files patent for a phone with Two Screens to make reading, gaming and conference calls easier," MailOnline, Dec. 18, 2013, retrieved Jul. 13, 2014 from http://www.dailymail.co.uk/sciencetech/article-2525812/Double-vision-Samsung-unveils-phone-two-screens-easier-reading-gaming-video-conferencing.html, 19 pages.

International Search Report for International (PCT) Patent Application No. PCT/US2011/053032, dated Apr. 27, 2012 3 pages.

(56) References Cited

OTHER PUBLICATIONS

International Preliminary Report on Patentability and Written Opinion for International (PCT) Patent Application No. PCT/US2011/053032, dated Apr. 11, 2013 5 pages.
Official Action for U.S. Appl. No. 13/247,977, dated Apr. 2, 2013 17 pages.
Final Action for U.S. Appl. No. 13/247,977, dated Aug. 1, 2013 22 pages.
Official Action for U.S. Appl. No. 13/247,977, dated Mar. 26, 2014 17 pages.
Final Action for U.S. Appl. No. 13/247,977, dated Oct. 23, 2014 20 pages.
Official Action for U.S. Appl. No. 13/247,977, dated Jul. 13, 2015 21 pages.
Final Action for U.S. Appl. No. 13/247,977, dated Dec. 10, 2015 20 pages.
Official Action for U.S. Appl. No. 13/223,747, dated May 31, 2013 22 pages.
Final Action for U.S. Appl. No. 13/223,747, dated Dec. 18, 2013 22 pages.
Official Action for U.S. Appl. No. 13/223,747, dated Jun. 10, 2014 25 pages.
Notice of Allowance for U.S. Appl. No. 13/223,747, dated Dec. 3, 2014 8 pages.
Official Action for U.S. Appl. No. 13/223,674, dated Nov. 20, 2012 19 pages.
Final Action for U.S. Appl. No. 13/223,674, dated Jun. 7, 2013 21 pages.
Official Action for U.S. Appl. No. 13/223,674, dated Aug. 1, 2014 24 pages.
Notice of Allowance for U.S. Appl. No. 13/223,674, dated Nov. 26, 2014 13 pages.
Notice of Allowance for U.S. Appl. No. 13/247,822, dated Oct. 2, 2013 15 pages.
Official Action for U.S. Appl. No. 13/223,809, dated May 1, 2013 17 pages.
Final Action for U.S. Appl. No. 13/223,809, dated Nov. 20, 2013 20 pages.
Official Action for U.S. Appl. No. 13/223,809, dated Jun. 16, 2014 18 pages.
Final Action for U.S. Appl. No. 13/223,809, dated Dec. 3, 2014 20 pages.
Official Action for U.S. Appl. No. 13/223,809, dated Jun. 4, 2015 22 pages.
Official Action for U.S. Appl. No. 14/844,970, dated Mar. 8, 2018 22 pages.
Final Action for U.S. Appl. No. 14/844,970, dated Aug. 16, 2018 25 pages.
Final Action for U.S. Appl. No. 14/844,970, dated May 23, 2019 25 pages.
Official Action for U.S. Appl. No. 13/223,727, dated May 14, 2013 11 pages.
Final Action for U.S. Appl. No. 13/223,727, dated Nov. 20, 2013 13 pages.
Official Action for U.S. Appl. No. 13/223,727, dated Jun. 16, 2014 13 pages.
Notice of Allowance for U.S. Appl. No. 13/223,727, dated Nov. 20, 2014 8 pages.
Official Action for U.S. Appl. No. 13/223,697, dated May 21, 2013 23 pages.
Final Action for U.S. Appl. No. 13/223,697, dated Dec. 2, 2013 23 pages.
Official Action for U.S. Appl. No. 13/223,697, dated Apr. 1, 2014 23 pages.
Final Action for U.S. Appl. No. 13/223,697, dated Oct. 14, 2014 16 pages.
Official Action for U.S. Appl. No. 13/839,727, dated Apr. 3, 2018 24 pages.
Final Action for U.S. Appl. No. 13/839,727, dated Sep. 14, 2018 19 pages.
Official Action for U.S. Appl. No. 13/839,727, dated Feb. 7, 2019 22 pages.
Official Action for U.S. Appl. No. 13/629,085, dated Sep. 22, 2014 10 pages.
Notice of Allowance for U.S. Appl. No. 13/629,085, dated Feb. 6, 2015 24 pages.
Official Action for U.S. Appl. No. 13/629,173, dated May 22, 2014 14 pages.
Final Action for U.S. Appl. No. 13/629,173, dated Sep. 12, 2014 17 pages.
Official Action for U.S. Appl. No. 13/629,173, dated Jan. 30, 2015 20 pages.
Final Action for U.S. Appl. No. 13/629,173, dated Jun. 5, 2015 18 pages.
Official Action for U.S. Appl. No. 12/948,667, dated Sep. 26, 2012 15 pages.
Final Action for U.S. Appl. No. 12/948,667, dated May 24, 2013 17 pages.
Official Action for U.S. Appl. No. 12/948,667, dated Jul. 24, 2014 17 pages.
Notice of Allowance for U.S. Appl. No. 12/948,667, dated Jan. 7, 2015 10 pages.
Official Action for U.S. Appl. No. 12/948,675, dated Oct. 31, 2014 15 pages.
Final Action for U.S. Appl. No. 12/948,675, dated May 6, 2015 18 pages.
Official Action for U.S. Appl. No. 14/819,712, dated Dec. 21, 2018 17 pages.
Final Action for U.S. Appl. No. 14/819,712, dated Jun. 25, 2019 13 pages.
Official Action for U.S. Appl. No. 12/948,676, dated Oct. 11, 2012 8 pages.
Final Action for U.S. Appl. No. 12/948,676, dated May 9, 2013 12 pages.
Official Action for U.S. Appl. No. 12/948,676, dated Sep. 26, 2013 11 pages.
Final Action for U.S. Appl. No. 12/948,676, dated Apr. 24, 2014 15 pages.
Official Action for U.S. Appl. No. 12/948,676, dated Jan. 6, 2015 16 pages.
Final Action for U.S. Appl. No. 12/948,676, dated Aug. 20, 2015 29 pages.
Official Action for U.S. Appl. No. 12/948,676, dated Apr. 5, 2019 24 pages.
Official Action for U.S. Appl. No. 12/948,684, dated Dec. 20, 2012 12 pages.
Final Action for U.S. Appl. No. 12/948,684, dated Mar. 29, 2013 13 pages.
Official Action for U.S. Appl. No. 12/948,684, dated Sep. 26, 2013 12 pages.
Official Action for U.S. Appl. No. 12/948,684, dated May 9, 2014 8 pages.
Official Action for U.S. Appl. No. 12/948,684, dated Oct. 3, 2014 18 pages.
Final Action for U.S. Appl. No. 12/948,684, dated Feb. 27, 2015 23 pages.
Notice of Allowance for U.S. Appl. No. 12/948,684, dated Feb. 16, 2016 5 pages.
Official Action for U.S. Appl. No. 13/187,026, dated Jun. 18, 2013 5 pages.
Official Action for U.S. Appl. No. 13/187,026, dated Nov. 20, 2013 10 pages.
Notice of Allowance for U.S. Appl. No. 13/187,026, dated Mar. 10, 2014 8 pages.
Notice of Allowance for U.S. Appl. No. 13/839,727, dated Jun. 5, 2019 5 pages.
Notice of Allowance for U.S. Appl. No. 13/839,727, dated Sep. 24, 2019 5 pages.
U.S. Appl. No. 16/785,857, filed Feb. 10, 2020, Sirpal et al.
Notice of Allowance for European Patent Application No. 11829757.1, dated Jan. 7, 2020 7 pages.
Notice of Allowance for U.S. Appl. No. 12/948,676, dated Oct. 25, 2019 17 pages.

(56) References Cited

OTHER PUBLICATIONS

Official Action for U.S. Appl. No. 16/649,819, dated May 8, 2020 25 pages.
Final Action for U.S. Appl. No. 16/649,819, dated Aug, 25, 2020 25 pages.
Official Action for U.S. Appl. No. 16/649,819, dated Jan. 4, 2021 24 pages.

* cited by examiner

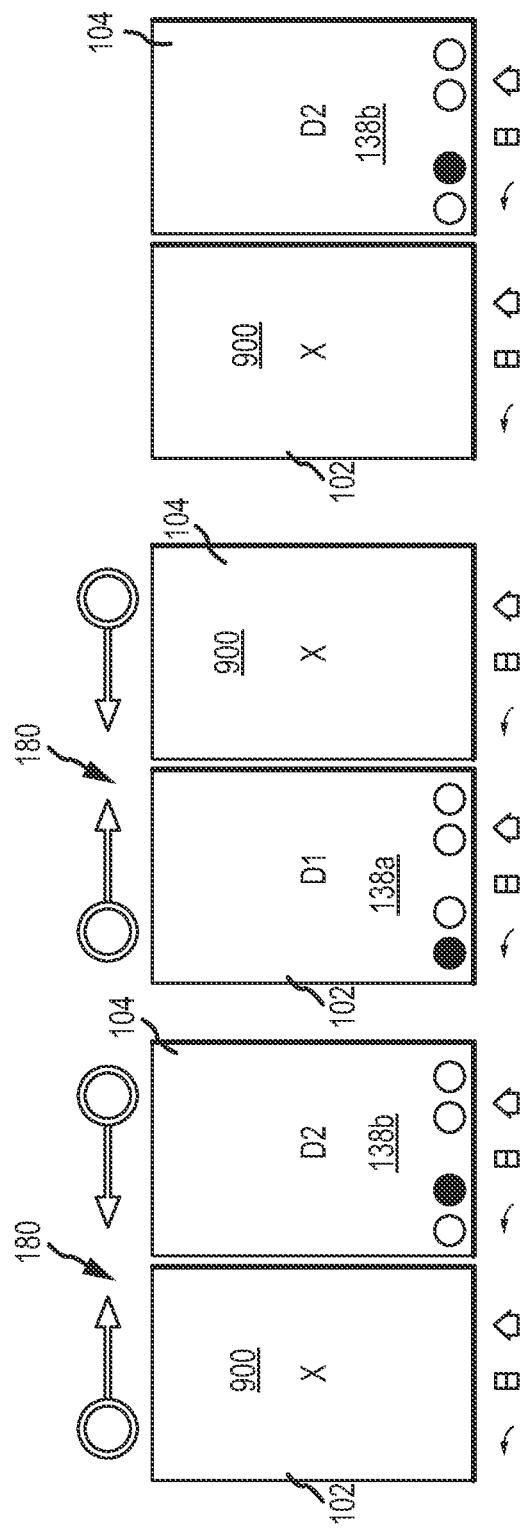

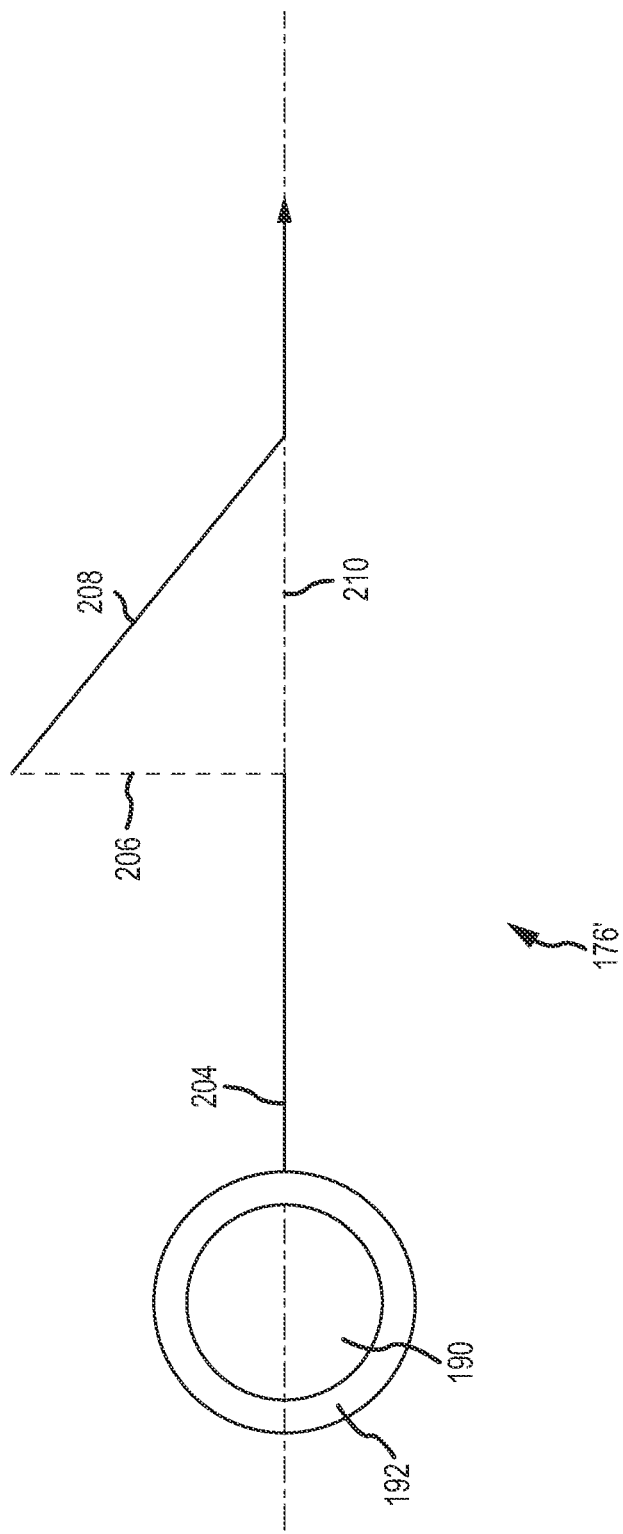

GESTURE CONTROLLED SCREEN REPOSITIONING FOR ONE OR MORE DISPLAYS

CROSS REFERENCE TO RELATED APPLICATIONS

This application is a continuation of and claims priority to U.S. patent application Ser. No. 14/819,712, filed Aug. 6, 2015, of the same title, which is a continuation of and claims priority to U.S. patent application Ser. No. 12/948,675, filed Nov. 17, 2010, of the same title, which claims priority to U.S. Provisional Application Ser. No. 61/389,000, filed Oct. 1, 2010, entitled "DUAL DISPLAY WINDOWING SYSTEM,"; Provisional Application Ser. No. 61/389,117, filed Oct. 1, 2010, entitled "MUL TI-OPERATING SYSTEM PORTABLE DOCKETING DEVICE"; and Provisional Application Ser. No. 61/389,087, filed Oct. 1, 2010, entitled "TABLET COMPUTING USER INTERFACE"; which each of the foregoing documents is hereby incorporated by reference in its entirety for all that it teaches and all purposes.

BACKGROUND

As the computing and communication functions of handheld computing devices become more powerful, the user interface and display elements of such devices have evolved by attempting to adapt user interface regimes developed for personal computers for use with handheld computing devices. However, this attempt to adapt prior user interface regimes has been met with various hurdles.

For instance, the majority of current handheld computing devices make use of a physical keypad for user interface. Many different implementations of physical keypads exist that vary in orientation and relationship to the device screen. However, in every case the physical keypads take up a certain percentage of the physical space of the device and increase the weight of the device. In addition to the disadvantages of size and weight, physical keypads are not configurable in the same manner as a touch screen based user interface. While certain limited forms of physical keypads currently have, on the keys themselves, configurable displays, such as elnk or OLED surfaces, to allow for reconfiguration of the keys, even in these cases, the physical layout of keys is not modifiable. Rather, only the values associated with the physical keys on the keypad may be changed.

Other methods may provide increased user configurability of physical keypads. These methods may include stickers and/or labels that can be added to keys to reference modified functions or plastic overlays on top of the keypad denoting different functional suites. For instance, the ZBoard keyboard, meant for laptop or desktop computer use, incorporates a dual layered physical keyboard which separates the keys and their layout from the connections which send signals to the machine. As such, different physical keyboard inserts for different applications can be inserted into a holder allowing full configurability such that the orientation and layout of the keys in addition to their denotation of function is configurable. This model could be extended to handheld computing devices; however, the rate at which such a modular keypad can change functions is much slower than a touch screen user interface. Furthermore, for each potential functional suite, an additional physical key layout must be carried by the user, greatly increasing the overall physical size and weight of such implementations. One advantage of a physical keypad for handheld computing devices is that the user input space is extended beyond the user display space such that none of the keys themselves, the housing of the keys, a user's fingers, or a pointing device obscure any screen space during user interface activities.

A substantial number of handheld computing devices make use of a small touch screen display to deliver display information to the user and to receive inputs from the user interface commands. In this case, while the configurability of the device may be greatly increased and a wide variety of user interface options may be available to the user, this flexibility comes at a price. Namely, such arrangements require shared screen space between the display and the user interface. While this issue is shared with other types of touch screen display/user interface technology, the small form factor of handheld computing devices results in a tension between the displayed graphics and area provided for receiving inputs. For instance, the small display further constrains the display space, which may increase the difficulty of interpreting actions or results while a keypad or other user interface scheme is laid overtop or to the side of the applications in use such that the application is squeezed into an even smaller portion of the display. Thus a single display touch screen solution, which solves the problem of flexibility of the user interface may create an even more substantial set of problems of obfuscation of the display, visual clutter, and an overall conflict of action and attention between the user interface and the display.

Single display touch screen devices thus benefit from user interface flexibility, but are crippled by their limited screen space such that when users are entering information into the device through the display, the ability to interpret information in the display can be severely hampered. This problem is exacerbated in several key situations when complex interaction between display and interface is required, such as when manipulating layers on maps, playing a game, or modifying data received from a scientific application. This conflict between user interface and screen space severely limits the degree to which the touch based user interface may be used in an intuitive manner.

SUMMARY

A first aspect of the present invention includes a method for controlling a plurality of displays of a handheld computing device. The method includes displaying a first screen in a first display of the plurality of displays when in a first display state. A first gesture input and a second gesture input are received at the handheld computing device. At least a portion of the first gesture input occurs simultaneously with at least a portion of the second gesture input. In response to this receiving, the plurality of displays are modified from the first display state to a second display state such that the first screen is displayed in a second display of the plurality of displays when in the second display state.

A second aspect of the present invention includes a handheld computing device that includes a processor. The device also includes a first display in operative communication with the processor that is also operable to display a first screen in a first display state. The device further includes a second display in operative communication with the processor, a first gesture sensor in operative communication with the processor that is also operable to receive a first gesture input, and a second gesture sensor in operative communication with the processor that is also operable to receive a second gesture input. The processor, upon receipt of the first and second touch gesture inputs, changes the first and second displays to a second display state such that the first screen is displayed on the second display in the second display state.

A third aspect of the present invention includes another method for controlling a plurality of displays of a handheld computing device. This method includes displaying a first screen in a first display and a second screen in a second display when the plurality of displays are in a first display state. The method further includes receiving a first gesture input at the handheld computing device and a second gesture input at the handheld computing device. At least a portion of the first gesture input occurs simultaneously with at least a portion of the second gesture input. The method also includes modifying the plurality of displays from the first state to a second display state in response to the receiving of the first and second gesture inputs. In turn, the first screen is displayed in the second display and the second screen is displayed in the first display when the plurality of displays are in the second display state.

A number of feature refinements and additional features are applicable to the foregoing aspects. These feature refinements and additional features may be used individually or in any combination. As such, each of the following features that will be discussed may be, but are not required to be, used with any other feature or combination of features of any of the aspects presented herein.

In one embodiment, the first gesture input may be a drag gesture in a first direction. The second gesture input may be a drag gesture in a second direction. The first direction and the second direction may be opposite. As such, the first gesture input and second gesture input may combine to define a pinch gesture. At least one of the first gesture input and second gesture input may be received at a touch sensitive device. As such, the gesture inputs may be touch gesture inputs. The touch sensitive device may be an off display touch sensitive device provided separately from the first or second display. As such, the gesture inputs may be received away from the first and second display such that the first and second displays are not obscured when receiving the gesture input. The first touch sensitive portion may be associated with the first display to comprise a first touch screen display, and the second touch sensitive portion may be associated with a second touch sensitive display to comprise a second touch sensitive display. Alternatively, the first touch sensitive portion may be disposed apart from said first display, and the second touch sensitive portion may be disposed apart from said second display.

In another embodiment, a second screen may be displayed in the second display when in the first display state and the first display when in the second display state. As such, the first screen and second screen may be exchanged between the first display and second display when the device is modified from the first display state to the second display state. The first screen may be associated with a first application executing on the handheld computing device, and the second screen may be associated with a second application executing on the handheld computing device. At least one of the first and second applications may be a single screen application. Additionally or alternatively, at least one of the first and second applications may be a multi screen application executing in a single screen mode. A first desktop screen may be displayed in the second display in the first display state and a second desktop screen may be displayed in the first display in the second display state.

In another embodiment, the plurality of displays comprise separate portions of a single display. The first display corresponds with a first portion of the single display and the second display corresponds with a second portion of the single display.

In still further embodiments, the handheld device may be a smartphone. The first display and second display may be positionable with respect to each other between an open and a closed position. When in the open position, the first display and the second display may both visible from the vantage point of a user. When in the closed position only one of the first display and the second display may be visible from the vantage point of a user.

BRIEF DESCRIPTION OF THE DRAWINGS

FIGS. 9A, 9B, and 9C are graphical representations of another embodiment of a handheld computing device functioning in response to a received gesture input to change between a first display state and a second display state.

FIG. 11 is a graphical representation of an embodiment of a gesture input.

DETAILED DESCRIPTION

The present disclosure is generally related to gesture inputs for interaction with a computing device. The interface controls are particularly suited for control of devices that have one or more displays capable of displaying graphical user interfaces (GUIs) on a handheld portable device. The following disclosure may, in various embodiments, be applied to other computing devices capable of displaying and responding to a GUI (e.g., laptop computers, tablet computers, desktop computers, touch screen monitors, etc.) and is not intended to be limited to handheld computing devices unless otherwise explicitly specified.

Figure 1:
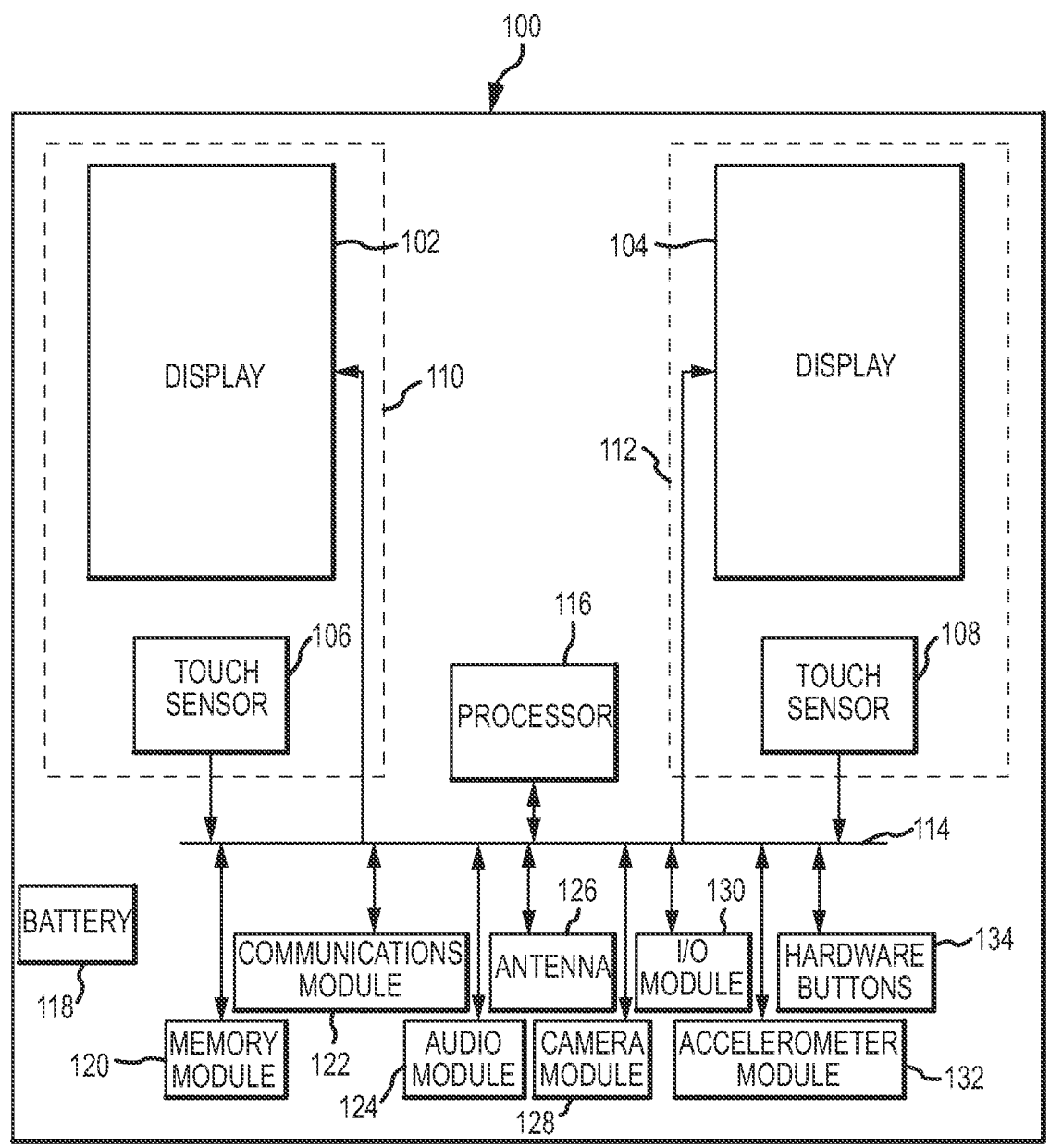
FIG. 1 is a schematic view of an embodiment of a handheld computing device.

FIG. 1 depicts an embodiment of a handheld computing device 100. The handheld computing device 100 may include a first display 102 and a second display 104. Additionally, while two displays (102, 104) may be shown and described below with regard to the functionality of various embodiments of handheld computing devices, a handheld computing device may be provided that includes more than two displays. In any regard, the first display 102 and the second display 104 may be independently controllable. The displays may be operative to display a displayed image or "screen". As used herein, the term "display" is intended to connote device hardware, whereas "screen" is intended to connote the displayed image produced on the display. In this regard, a display is a physical piece of hardware that is operable to render a screen. A screen may refer to a majority of the display. For instance, a screen may occupy all of the display area except for areas dedicated to other functions (e.g., menu bars, status bars, etc.) A screen may be associated with an application and/or an operating system executing on the handheld computing device 100. For instance, application screens or desktop screens may be displayed. An application may have various kinds of screens that are capable of being manipulated as will be described further below. In an embodiment, each display may have a resolution of 480 pixels by 800 pixels, although higher and lower resolution displays may also be provided.

A screen may be associated with an operating system, an application, or the like. In some instances, a screen may include interactive features (e.g., buttons, text fields, toggle fields, etc.) capable of manipulation by way of a user input. The user input may be received by various input devices (e.g., a physical keyboard, a roller ball, directional keys, a touch sensitive device, etc.). In some instances, a screen may simply include graphics and have no ability to receive an input by a user. In other instances, graphics features and input features may both be provided by a screen. As such, the one or more displays of a handheld computing device, the screens displayed on the one or more displays, and various user input devices may comprise a GUI that allows a user to exploit functionality of the handheld computing device.

The handheld computing device 100 may be configurable between a first position and a second position. In the first position, a single display (e.g., the first display 102 or the second display 104) may be visible from the perspective of a user. Both displays 102, 104 may be exposed on an exterior of the handheld device 100 when in the first position, but the displays 102, 104 may be arranged in a non-adjacent manner such that both displays 102, 104 are not concurrently visible from the perspective of a user (e.g., one display may be visible from the front of the device 100 and the other display may be visible from the back of the device 100).

The handheld computing device 100 may also be provided in the second position such that the displays 102, 104 may be concurrently viewable from the perspective of a user (e.g., the displays 102, 104 may be positioned adjacent to one another). The displays 102, 104 may be displayed in the second position such that the displays 102, 104 are arranged end-to-end or side-by-side. Additionally, the displays 102, 104 may be arranged in a portrait orientation or a landscape orientation with respect to a user. As will be discussed further below, a portrait orientation is intended to describe an arrangement of the handheld computing device, wherein the longer dimension of the display of the handheld computing device is vertically oriented (e.g., with respect to gravity or the perspective of a user). A landscape orientation is intended to describe an arrangement wherein the shorter dimension of the display of the handheld computing device is vertically oriented (e.g., with respect to gravity or the perspective of a user). Furthermore, the longer dimension and shorter dimension may refer to each display individually or the combined viewing area of the one or more displays of the device. Thus, when the individual displays are arranged in a portrait orientation, the overall display area may be arranged in a landscape orientation, and vice versa. Additionally, the displays and screens may be in different respective orientations. For instance, when the displays are in a landscape orientation, one or more screens may be rendered in a portrait orientation on the displays.

The handheld computing device 100 may be manipulated between the first position (i.e., a single display visible from a user's perspective) and the second position (i.e., at least two displays concurrently visible from the user's perspective) in a variety of manners. For instance, the device 100 may include a slider mechanism such that the first and second displays 102, 104 are disposable adjacent to one another in a parallel fashion in a second position and slideable to the first position where only a single display is viewable and the other display is obscured by the viewable display.

Alternatively, the device 100 may be arranged in a clam shell type arrangement wherein a hinge is provided between the first display 102 and the second display 104 such that the displays 102, 104 are concurrently visible by a user when in the second position (i.e., an open position). The displays 102, 104 may be provided on an interior clam shell portion or an exterior clam shell portion of the device 100. In this regard, both displays 102, 104 may be visible from the front and the back of the device, respectively, when the device is in the first position (i.e., the closed position). When the device 100 is in the open position, the displays 102, 104 may be provided adjacent and parallel to one another. Alternative arrangements of the handheld computing device 100 are contemplated wherein different arrangements and/or relative locations of the displays may be provided when in the first and second position.

In addition, the first display 102 and the second display 104 may be provided as entirely separate devices. In this regard, a user may manipulate the displays 102, 104 such that they may be positioned adjacent to one another (e.g., side-by-side or end-to-end). The displays 102, 104 may be in operative communication when adjacently positioned such that the displays 102, 104 may operate in the manner provided in greater detail below when adjacently positioned (e.g., via physical contacts, wireless communications, etc.). A retention member (not shown) may be provided to retain the separate displays 102, 104 in an adjacent position. For instance, the retention member may include coordinating magnets, mechanical clips or fasteners, elastic members, etc.

While the foregoing has referenced two displays 102 and 104, alternate embodiments of a handheld device may include more than two displays. In this regard, the two or more displays may behave in a manner in accordance with the foregoing wherein only a single display is viewable by a user in a first position and multiple displays (i.e., more than two displays) are viewable in a second position. Additionally, in one embodiment, the two displays 102 and 104 may comprise separate portions of a unitary display. As such, the first display 102 may be a first portion of the unitary display and the second display 104 may be a second portion of the unitary display. For instance, the handheld computing device 100 (e.g., having a first and second display 102 and 104) may be operatively connected to the unitary display (e.g., via a connector or a dock portion of the unitary display) such that the first display 102 and the second display 104 of the handheld computing device 100 are emulated on the unitary display. As such, the unitary display may have first and second portions corresponding to and acting in a similar manner to the first and second display 102 and 104 of the handheld computing device 100 described below.

The handheld computing device 100 may further include one or more input devices that may be used to receive user inputs. These input devices may be operative to receive gesture inputs from a user, and, accordingly, may be referred to generally as gesture sensors. A number of different types of gesture sensors may be provided. Some examples include, but are not limited to traditional input devices (keypads, trackballs, etc.), touch sensitive devices, optical sensors (e.g., a camera or the like), etc. The discussion contained herein may reference the use of touch sensitive devices to receive gesture inputs. However, the use of touch sensitive devices is not intended to limit the means for receiving gesture inputs to touch sensitive devices alone and is provided for illustrative purposes only. Accordingly, any of the foregoing means for receiving a gesture input may be used to produce the functionality disclosed below with regard to gesture inputs received at touch sensitive devices.

In this regard, the handheld computing device 100 may include at least a first touch sensor 106. Furthermore, the handheld computing device may include a second touch sensor 108. The first touch sensor 106 and/or the second touch sensor 108 may be touchpad devices, touch screen devices, or other appropriate touch sensitive devices. Examples include capacitive touch sensitive panels, resistive touch sensitive panels, or devices employing other touch sensitive technologies. The first touch sensor 106 and/or second touch sensor 108 may be used in conjunction with a portion of a user's body (e.g., finger, thumb, hand, etc.), a stylus, or other acceptable touch sensitive interface mechanisms known in the art. Furthermore, the first touch sensor 106 and/or the second touch sensor 108 may be multi-touch devices capable of sensing multiple touches simultaneously.

The first touch sensor 106 may correspond to the first display 102 and the second touch sensor 108 may correspond to the second display 104. In one embodiment of the handheld computing device 100, the first display 102 and the first touch sensor 106 comprise a first touch screen display 110. In this regard, the first touch sensor 106 may be transparent or translucent and positioned with respect to the first display 102 such that a corresponding touch received at the first touch sensor 106 may be correlated to the first display 102 (e.g., to interact with a screen presented thereon). Similarly, the second display 104 and the second touch sensor 108 may comprise a second touch screen display 112. In this regard, the second touch sensor 108 may be positioned with respect to the second display 104 such that a touch received at the second touch sensor 108 may be correlated to the second display 104 (e.g., to interact with a screen presented thereon). Alternatively, the first touch sensor 106 and/or the second touch sensor 108 may be provided separately from the displays 102, 104. Furthermore, in an alternate embodiment, only a single touch sensor may be provided that allows for inputs to control both the first display 102 and the second display 104. The single touch sensor may also be provided separately or integrally with the displays.

In this regard, the first and second touch sensors 106, 108 may have the substantially same footprint on the handheld computing device 100 as the displays 102, 104. Alternatively, the touch sensors 106, 108 may have a footprint including less of the entirety of the displays 102, 104. Further still, the touch sensors 106, 108 may include a footprint that extends beyond the displays 102, 104 such that at least a portion of the touch sensors 106, 108 are provided in non-overlapping relation with respect to the displays 102, 104. As discussed further below, the touch sensors 106, 108 may alternatively be provided in complete non-overlapping relation such that the footprint of the touch sensors 106, 108 is completely different than the footprint of the displays 102, 104.

With reference to FIGS. 9A-B, various potential arrangements are depicted for the first display 102, the second display 104, and touch sensors 106', 106", and 108". In FIG. 9A, the first 102 and second display 104 are arranged side-by-side such that a crease 196 separates the displays. In this regard, the first display 102 and second display 104 may be arranged in a clam-shell type arrangement such that the crease 196 includes a hinge that allows for pivotal movement between the first display 102 and second display 104 as discussed above. A touch sensor 106' may span the width of both the first display 102 and the second display 104. In this regard, the touch sensor 106' may span the crease 196 without interruption. Alternatively, as shown in FIG. 9B, separate touch sensors 106" and 108" may be provided on either side of the crease 196. In this regard, each of the touch sensors 106" and 108" may span the width of each of the first display 102 and second display 104, respectively.

In any of the arrangements shown in FIGS. 9A-B, the displays (102, 104) may also comprise touch screen displays that may be used in conjunction with touch sensitive portions that are provided separately from the touch screen displays. Thus, displays 102 and 104 may both comprise touch screen displays and be provided in addition to touch sensitive devices 106', 106", and 108". Accordingly, a combination of touch screen displays (e.g., 110, 112) and off display touch sensors (e.g., 106', 106", 108") may be provided for a single device. Touch inputs may be received at both a touch screen display (110, 112) and off display touch sensor (106', 106", 108"). In this regard, gestures received at an off screen display sensor may have a different functionality than the same gesture received at a touch screen display. Also, a touch sensitive device may be divided into a plurality of zones. The same gesture received in different zones may have different functionality. For instance, a percentage (e.g., 10%, 25%, etc.) of the touch sensitive device at the top or bottom of the display may be defined as a separate zone than the remainder of the touch sensitive device. Thus, a gesture received in this zone may have a different functionality than a gesture received in the remainder of the touch sensitive device.

The handheld computing device 100 may further include a processor 116. The processor 116 may be in operative communication with a data bus 114. The processor 116 may generally be operative to control the functionality of the handheld device 100. For instance, the processor 116 may execute an operating system and be operative to execute applications. The processor 116 may be in communication with one or more additional components 120-134 of the handheld computing device 100 as will be described below. For instance, the processor 116 may be in direct communication with one more of the additional components 120-134 or may communicate with the one or more additional components via the data bus 114. Furthermore, while the discussion below may describe the additional components 120-134 being in operative communication with the data bus 114, it will be understood that in other embodiments, any of the additional components 120-134 may be in direct operative communication with any of the other additional components 120-134. Furthermore, the processor 116 may be operative to independently control the first display 102 and the second display 104 and may be operative to receive input from the first touch sensor 106 and the second touch sensor 108, the processor 116 may comprise one or more different processors. For example, the processor 116 may comprise one or more application specific integrated circuits (ASICs), one or more field-programmable gate arrays (FPGAs), one or more general purpose processors operative to execute machine readable code, or a combination of the foregoing.

The handheld computing device may include a battery 118 operative to provide power to the various devices and components of the handheld computing device 100. In this regard, the handheld computing device 100 may be portable.

The handheld computing device 100 may further include a memory module 120 in operative communication with the data bus 114. The memory module 120 may be operative to store data (e.g., application data). For instance, the memory 120 may store machine readable code executable by the processor 116 to execute various functionalities of the device 100.

Additionally, a communications module 122 may be in operative communication with one or more components via the data bus 114. The communications module 122 may be operative to communicate over a cellular network, a Wi-Fi connection, a hardwired connection or other appropriate means of wired or wireless communication. The handheld computing device 100 may also include an antenna 126. The antenna 126 may be in operative communication with the communications module 122 to provide wireless capability to the communications module 122. Accordingly, the handheld computing device 100 may have telephony capability (i.e., the handheld computing device 100 may be a smartphone device).

An audio module 124 may also be provided in operative communication with the data bus 114. The audio module 124 may include a microphone and/or speakers. In this regard, the audio module 124 may be able to capture audio or produce sounds. Furthermore, the device 100 may include a camera module 128. The camera module 128 may be in operative communication with other components of the handheld computing device 100 to facilitate the capture and storage of images or video.

Additionally, the handheld computing device 100 may include an I/O module 130. The I/O module 130 may provide input and output features for the handheld computing device 100 such that the handheld computing device 100 may be connected via a connector or other device in order to provide syncing or other communications between the handheld computing device 100 and another device (e.g., a peripheral device, another computing device etc.).

The handheld computing device 100 may further include an accelerometer module 132. The accelerometer module 132 may be able to monitor the orientation of the handheld computing device 100 with respect to gravity. In this regard, the accelerometer module 132 may be operable to determine whether the handheld computing device 100 is substantially in a portrait orientation or landscape orientation. The accelerometer module 132 may further provide other control functionality by monitoring the orientation and/or movement of the handheld computing device 100.

The handheld computing device 100 may also include one or more hardware buttons 134. The hardware buttons 134 may be used to control various features of the handheld computing device 100. The hardware buttons 134 may have fixed functionality or may be contextual such that the specific function of the buttons changes during operation of the handheld computing device 100. Examples of such hardware buttons may include, but are not limited to, volume control, a home screen button, an end button, a send button, a menu button, etc.

With further reference to FIGS. 2A-D, various screens of an embodiment of a device are shown. The screens shown in FIGS. 2A-D are intended to represent the potential screens that may be displayed. Thus, while multiple screens may be shown, only one or a subset of the multiple screens may be shown on the displays of the device at any one moment. In this regard, a screen may be described in a relative location to the displays or other screens (e.g., to the left of a display, to the right of a display, under another screen, above another screen, etc.). These relationships may be logically established such that no physical display reflects the relative position. For instance, a screen may be moved off a display to the left. While the screen is no longer displayed on the display, the screen may have a virtual or logical position to the left of the display from which it was moved. This logical position may be recognized by a user and embodied in values describing the screen (e.g., values stored in memory correspond to the screen). Thus, when referencing screens in relative locations to other screens, the relationships may be embodied in logic and not physically reflected in the display of the device.

FIGS. 2A-D may display a number of different screens that may be displayed at various instances of operation of a handheld device and are not intended to be presented in any particular order or arrangement. Single screen applications and multi screen applications may be provided. A single screen application is intended to describe an application that is capable of producing a screen that may occupy only a single display at a time. A multi screen application is intended to describe an application that is capable of producing one or more screens that may simultaneously occupy multiple displays. Additionally, a multi screen application may occupy a single display. In this regard, a multi screen application may have a single screen mode and a multi screen mode.

Figure 2A:
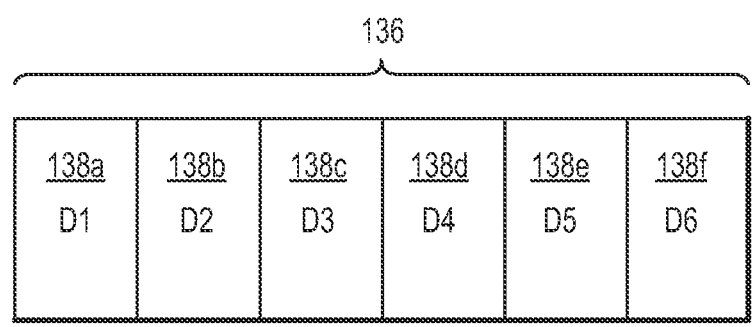
FIGS. 2A-D are graphical representations of an embodiment of a handheld computing device in various instances of operation.

A desktop sequence 136 is displayed in FIG. 2A. The desktop sequence 136 may include a number of individual desktop screens 138a-138f. Thus, each desktop screen 138 may occupy substantially the entirety of a single display (e.g., the first display 102 or second display 104 of FIG. 1). The desktop screens 138a-138f may be in a predetermined order such that the desktop screens 138a-138f appear consecutively and the order in which the desktop screens appear may not be reordered. However, the desktop screens 138a-138f may be sequentially navigated (e.g., in response to a user input). That is, one or more of the desktop screens 138a-138f may be sequentially displayed on a handheld device as controlled by a user input.

Figure 2B:
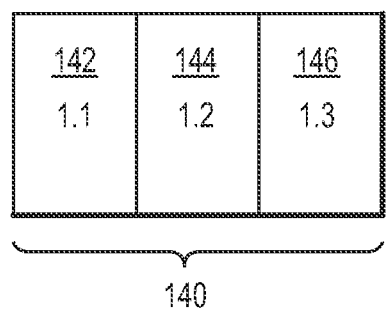
Figure 2C:
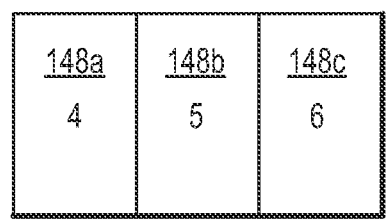

Additionally, FIG. 2B displays a hierarchal application sequence 140 of a multi screen application. The hierarchal application sequence 140 may include a root screen 142, one or more node screens 144, and a leaf screen 146. The root screen 142 may be a top level view of the hierarchical application sequence 140 such that there is no parent screen corresponding to the root screen 142. The root screen 142 may be a parent to a node screen 144. One or more node screens 144 may be provided that are related as parent/children. A node screen may also serve as a parent to a leaf screen 146. By leaf screen 146, it is meant that the leaf screen 146 has no corresponding node screen for which the leaf screen 146 is a parent. As such, the leaf screen does not have any children node screens 144. FIG. 2C depicts various single screen applications 148a, 148b, and 148c arranged sequentially. Each of these single screen applications may correspond to a different executing application. For instance, in FIG. 2C Application 4, Application 5, and Application 6 may be executing on the device and correspond to each single screen 148a, 148b, and 148c, respectively.

Figure 2D:
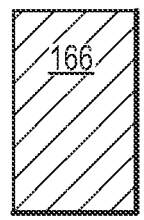

FIG. 2D also includes an empty view 166. The empty view 166 may be used during transitions of a screen (e.g., movement of screen between a first display and a second display). It is not necessary that the empty view 166 be interpretable by the user as an effective GUI screen. The empty view 166 merely communicates to the user that an action regarding the screen (e.g., the movement of the screen with respect to one or more displays) is occurring. An application displaying an empty view 166 need not be able to rest, wait, process or interpret input. The empty view 166 may display a screen, or a representation thereof, as it is being moved in proportion to the amount of the screen that has been moved from a first display to a second display as will be discussed in greater detail below. In this regard, the empty view 166 may be used to relate information regarding the position of a screen during a transition of the screen (e.g., in response to gesture). While shown in FIG. 2D as a grayed screen, an empty view 166 is only intended to refer to a screen not capable of receiving an input. In this regard, the display of an empty view 166 may include an animation or the like showing the response of a screen as it is being moved or changed (e.g., modified into or out of a landscape mode).

Figure 3A:
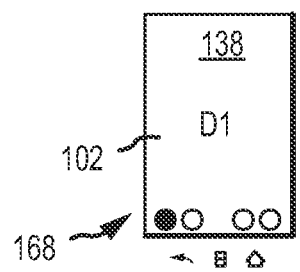
FIGS. 3A-K are graphical representations of an embodiment of a handheld computing device provided in different positions, orientations, and instances of operation.
Figure 3B:
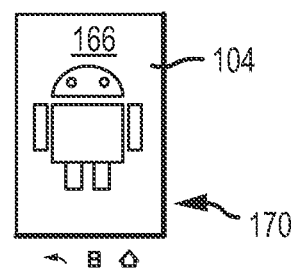

FIGS. 3A-K depict various arrangements and statuses of displays 102, 104 of a device that are possible in various embodiments of a handheld computing device according to the present disclosure. For instance, when in the first (e.g., closed) position, a closed front display 168 may be visible as shown in FIG. 3A. The closed front display 168 may correspond with the first display 102 or the second display 104. The closed front 168 as displayed may be occupied by a desktop screen 138 as shown in FIG. 3A. Alternatively, an application with a single screen or a multi screen application in single screen mode may be displayed in the closed front 168. A closed back display 170 may be viewable from an opposite side of the display when the device is in a closed position, as shown in FIG. 3B. The closed back 170 may display a different desktop screen or application screen than the closed front 168 or may simply display an empty view 166 (e.g., displaying an icon or other graphic) and lack functionality as an interface.

Figure 3C:
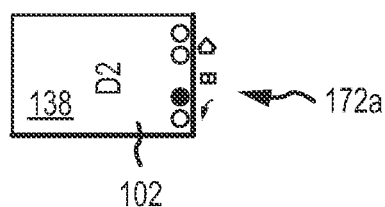
Figure 3D:
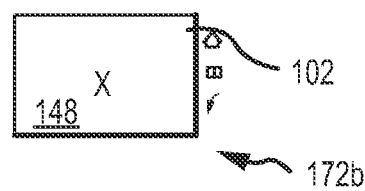

FIG. 3C depicts a closed device in a landscape orientation 172. In one embodiment, a landscape mode (i.e., wherein the display is adjusted to display a screen 148 in a landscape orientation) may not be enabled as shown in FIG. 3C. Alternatively, the landscape mode may be enabled such that the screen 148 is modified when the device is sensed in a landscape orientation 172, such that the screen 148 is rendered in a landscape orientation as shown at FIG. 3D.

Figure 3E:
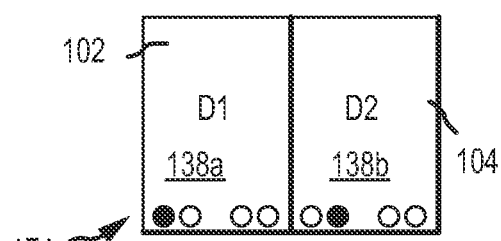

The device may further be provided in a second (e.g., open) position 174 as shown in FIG. 3E. In the open position 174, at least two displays 102, 104 are arranged such that the two displays 102, 104 are both visible from the vantage point of a user. The two displays 102, 104 may be arranged in a side-by-side fashion when in the open position 174. Thus, each of the two displays 102, 104 may display separate screens. For instance, the displays 102, 104 may each display a separate desktop screen 138*a*, 138*b*, respectively. While the individual displays 102 and 104 are in a portrait orientation as shown in FIG. 3E, it may be appreciated that the full display area (comprising both the first display 102 and the second display 104) may be arranged in a landscape orientation. Thus, whether the device as depicted in FIG. 3E is in a landscape or portrait orientation may depend on whether the displays are being used individually or collectively. If used collectively as a unitary display, the device may be in a landscape orientation, whereas if the displays are used separately, the orientation shown in FIG. 3E may be referred to as a portrait orientation.

Figure 3F:
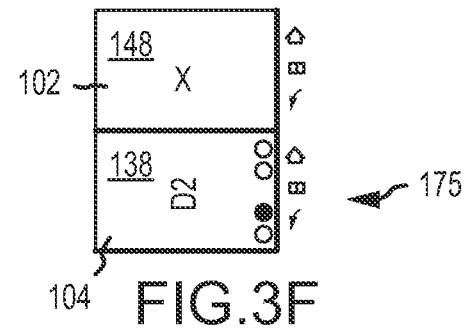
Figure 3G:
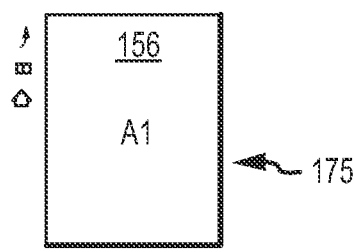
Figure 3H:
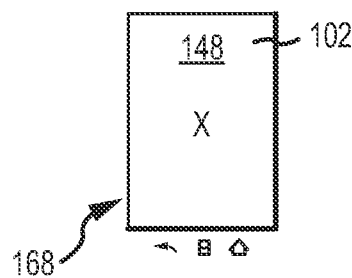

Additionally, when the device is in an open position 174 as shown in FIG. 3F, a similar dependency with regard to the use of the screens as a unitary display or separate displays may also affect whether the device is in a portrait orientation or landscape orientation. As can be appreciated, each individual screen is in a landscape orientation, such that if the displays are used separately, the device may be in a landscape orientation. If used as a unitary display, the device may be in a portrait orientation. In any regard, as shown in FIG. 3F, a single screen 148 may occupy a first display 102 and the second display 104 may display a desktop screen 138. The single screen 148 may be displayed in a landscape or portrait mode. Alternatively, a device in an open orientation 172 may display a multi screen GUI 156 that may occupy both displays 102, 104 in a portrait orientation as shown in FIG. 3G such that the individual displays are in a landscape orientation.

Figure 3I:
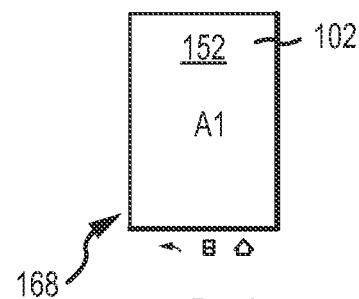
Figure 3J:
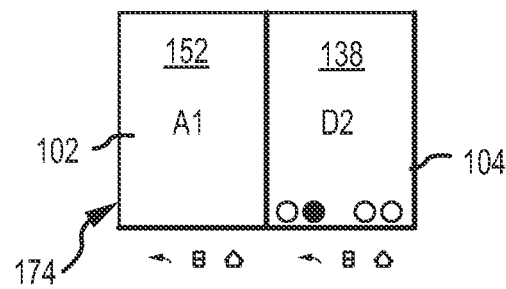
Figure 3K:
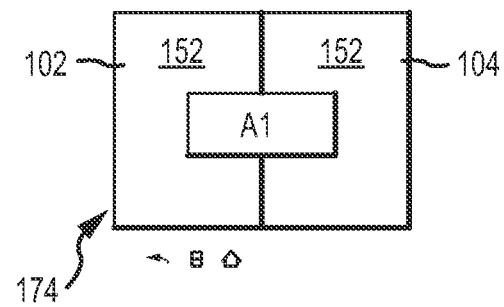

FIGS. 3I-K depict the potential arrangements of the screens of a multi screen application 152. The multi screen application 152 may, in one mode, occupy a single display 102 when the device is in a closed position 168 as shown in FIG. 3I. That is, the multi screen application 152 may be in a single screen mode. Alternatively, when the device is in an open position as shown in FIG. 3J, the multi screen application 152 may still occupy a single display 102 in single screen mode. Furthermore, the multi screen application 152 may be expanded to occupy both displays 102, 104 when the device is in the open position as shown in FIG. 3K. In this regard, the multi screen application 152 may also execute in a multi screen mode. Various options may be provided for expanding the multi screen application 152 from a single screen mode to a multi screen mode.

For example, the multi screen application 152 may be maximized from a single screen mode displayed in a single display to two screens displayed in two displays such that a parent screen is displayed in the first display and a node screen is expanded into the second display. In this regard, each of the screens displayed in the first and second display may be independent screens that comprise part of a hierarchical application sequence (e.g., as shown in FIG. 2B). Alternatively, the single screen mode of the multi screen application may simply be scaled such that the contents of the single screen are scaled to occupy both displays. Thus, the same content displayed in the single screen is scaled to occupy multiple displays, but no additional viewing area or graphics are presented. Further still, the maximization of the multi screen application from a single screen mode to a multi screen mode may result in the expansion of the viewable area of the application. For example, if a multi screen application is displayed in single screen mode, upon maximization into multi screen mode, the viewable area of the multi-screen application may be expanded while the scale of the graphics displayed remains the same. In this regard, the viewable area of the multi-screen application may be expanded into the second display while the scaling remains constant upon expansion.

In this regard, an application may have configurable functionality regarding the nature and behavior of the screens of the application. For instance, an application may be configurable to be a single screen application or a multi screen application. Furthermore, a multi screen application may be configurable as to the nature of the expansion of the multi screen application between a single screen mode and a multi screen mode. These configuration values may be default values that may be changed or may be permanent values for various applications. These configuration values may be communicated to the device (e.g., the processor 116) to dictate the behavior of the application when executing on the device.

Figure 4:
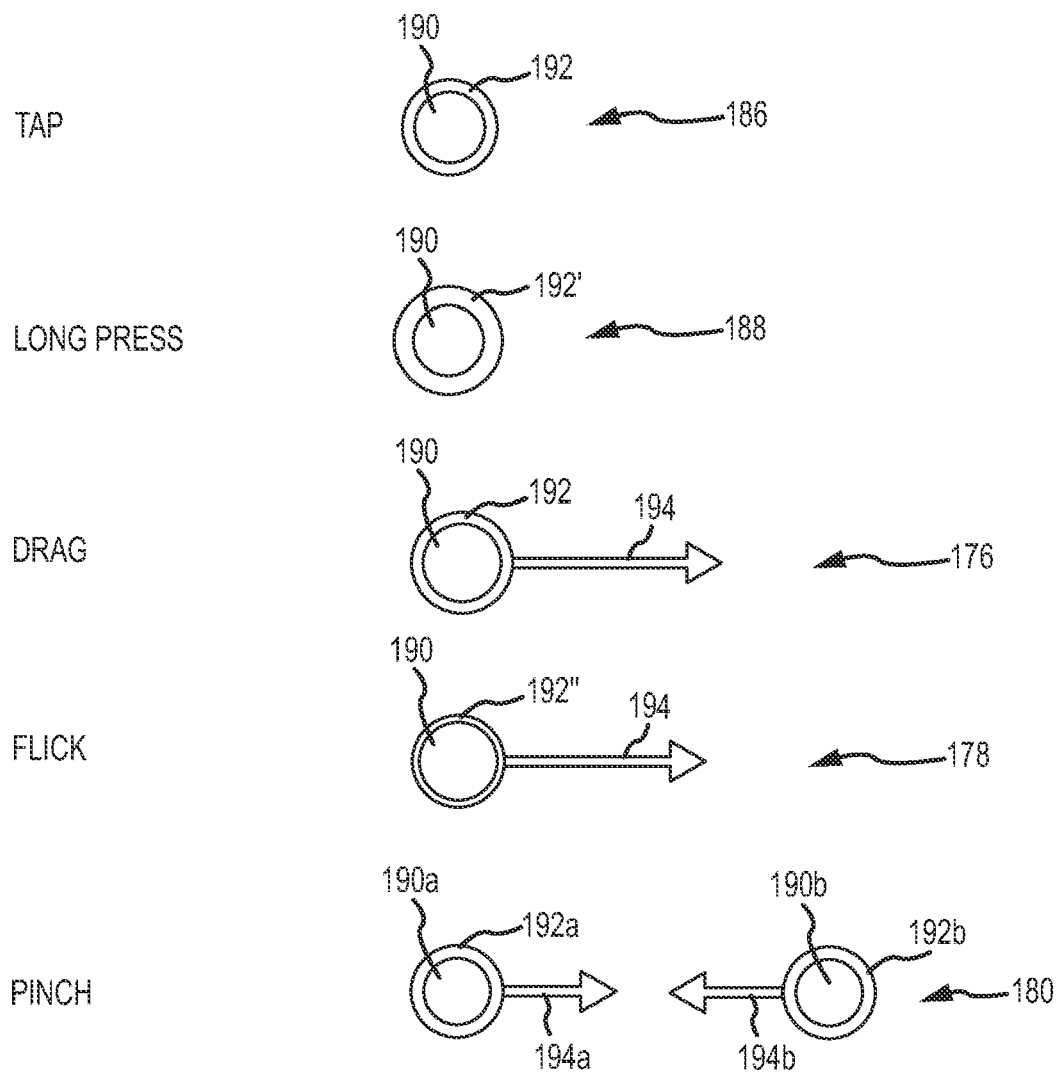
FIG. 4 includes graphical representations of various gesture inputs for controlling a handheld computing device.

FIG. 4 depicts various graphical representations of gesture inputs that may be recognized by a handheld computing device. Such gestures may be received at one or more touch sensitive portions of the device. In this regard, various input mechanisms may be used in order to generate the gestures shown in FIG. 4. For example a stylus, a user's finger(s), or other devices may be used to activate the touch sensitive device in order to receive the gestures. The use of a gesture may describe the use of a truncated input that results in functionality without the full range of motion necessary to conventionally carry out the same functionality. For instance, movement of screens between displays may be carried out by selecting and moving the screen between displays such that the full extent of the motion between displays is received as an input. However, such an implementation may be difficult to accomplish in that the first and second displays may comprise separate display portions without continuity therebetween. As such, a gesture may truncate the full motion of movement or provide an alternative input to accomplish the same functionality. Thus, movement spanning the first and second display may be truncated so that the gesture may be received at a single touch sensitive device. The use of gesture inputs is particularly suited to handheld computing devices in that the full action of an input may be difficult to execute given the limited input and display space commonly provided on a handheld computing device.

With reference to FIG. 4, a circle 190 may represent a touch received at a touch sensitive device. The circle 190 may include a border 192, the thickness of which may indicate the length of time the touch is held stationary at the touch sensitive device. In this regard, a tap 186 has a thinner border 192 than the border 192' for a long press 188. In this regard, the long press 188 may involve a touch that remains stationary on the touch sensitive display for longer than that of a tap 186. As such, different gestures may be registered depending upon the length of time that the touch remains stationary prior to movement.

A drag 176 involves a touch (represented by circle 190) with movement 194 in a direction. The drag 176 may involve an initiating touch that remains stationary on the touch sensitive device for a certain amount of time represented by the border 192. In contrast, a flick 178 may involve a touch with a shorter dwell time prior to movement than the drag as indicated by the thinner border 192" of the flick 178. Thus, again different gestures may be produced by differing dwell times of a touch prior to movement. The flick 178 may also include movement 194. The direction of movement 194 of the drag and flick 178 may be referred to as the direction of the drag or direction of the flick. Thus, a drag to the right may describe a drag 176 with movement 194 to the right.

In an embodiment, a gesture having movement (e.g., a flick or drag gesture as described above) may be limited to movement in a single direction along a first axis. Thus, while movement in a direction different than along the first axis may be disregarded so long as contact with the touch sensitive device is unbroken. In this regard, once a gesture is initiated, movement in a direction not along an axis along which initial movement is registered may be disregarded or only the vector component of movement along the axis may be registered.

While the directional gestures (e.g., the drag 176 and flick 178) shown in FIG. 4 include only horizontal motion after the initial touch, this may not be actual movement of the touch during the gesture. For instance, once the drag is initiated in the horizontal direction, movement in a direction other than in the horizontal direction may not result in movement of the screen to be moved in the direction different and the horizontal direction. For instance, with further reference to FIG. 11, the drag 176 from left to right may be initiated with initial movement 204 from left to right along an initiated direction 210. Subsequently, while maintaining contact with the touch sensitive device, the user may input an off direction movement 206 in a direction different than the initiated direction 210. In this regard, the off direction movement 206 may not result in any movement of a screen between two displays. Furthermore, the user may input partially off direction movement 208, where only a vector portion of the movement is in the direction of the initiated direction 210. In this regard, only the portion of the partially off direction movement 208 may result in movement of a screen between displays. In short, the movement of application screens between the first display 102 and the second display 104 may be constrained along a single axis along which the displays are arranged.

Additionally, FIG. 4 depicts a pinch gesture 180. The pinch gesture 180 may be initiated by a first touch input 190a and a second touch input 190b to a touch sensitive device. The first touch input 190a and second touch input 190b may be received at the same touch sensitive device or may be received on different touch sensitive devices. The first touch input 190a may be held for a certain amount of time, as represented by the border 192a. Also, the second touch input 190b may be held for a certain amount of time, as represented by the border 192b. The first touch input 190a and the second touch input 190b may also include corresponding first movement 194a and second movement 194b, respectively. The first touch input 190a may include first movement 194a in a direction generally towards the second touch input 190b. Also, the second touch input 190b may include second movement 194b in a direction generally towards the first touch input 190a. In this regard, the pinch gesture 180 may be accomplished by user touching the touch sensitive portion of the device in a manner that resembles a user imparting a pinching motion with respect to the device.

Figures 5A, 5B:
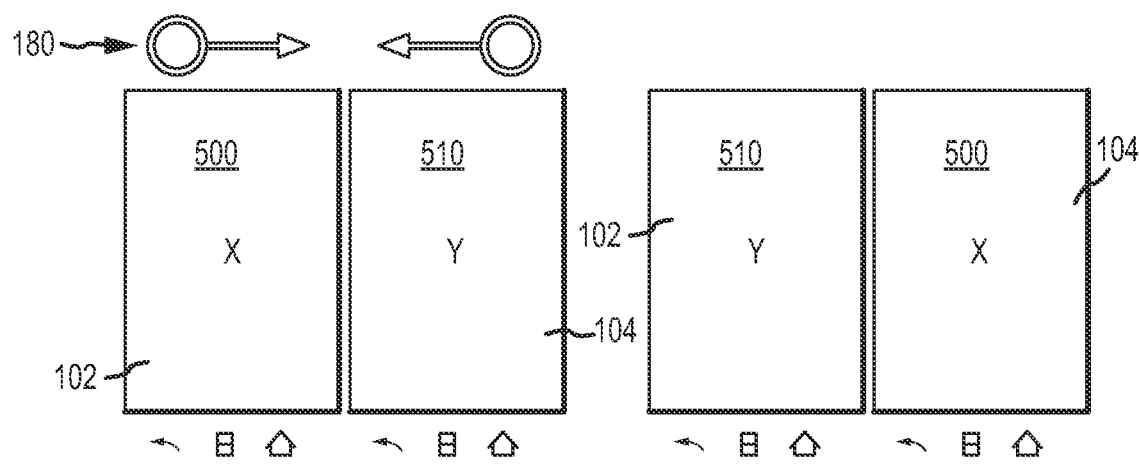
FIGS. 5A and 5B are graphical representations of an embodiment of a handheld computing device functioning in response to a gesture input to change between a first display state and a second display state.

With additional reference to FIGS. 5A and 5B, the function of a handheld computing device in response to a gesture input is shown. In FIG. 5A, a first screen 500 is displayed on the first display 102. A second screen 510 is displayed on a second display 104. The first screen 500 and second screen 510 may be associated with single screen applications, or may be other single screen variants, such as a multi screen application executing in single screen mode. When in the configuration shown in FIG. 5A, a pinch gesture 180 may be received at the handheld computing device. For instance, the pinch 180 may be received at an off display touch sensitive device (not shown). In response to the pinch gesture 180, the first display 102 may be changed to the display state shown in FIG. 5B such that the second screen 510 is displayed on the first display 102. Also, the second display 104 may be changed to the display state shown in FIG. 5B such that the first display 500 is displayed on the second display 104. In this regard, the screens 500 and 510 may be swapped between a first display 102 and a second display 104 upon receipt of the pinch gesture 180.

Figures 6A, 6B:
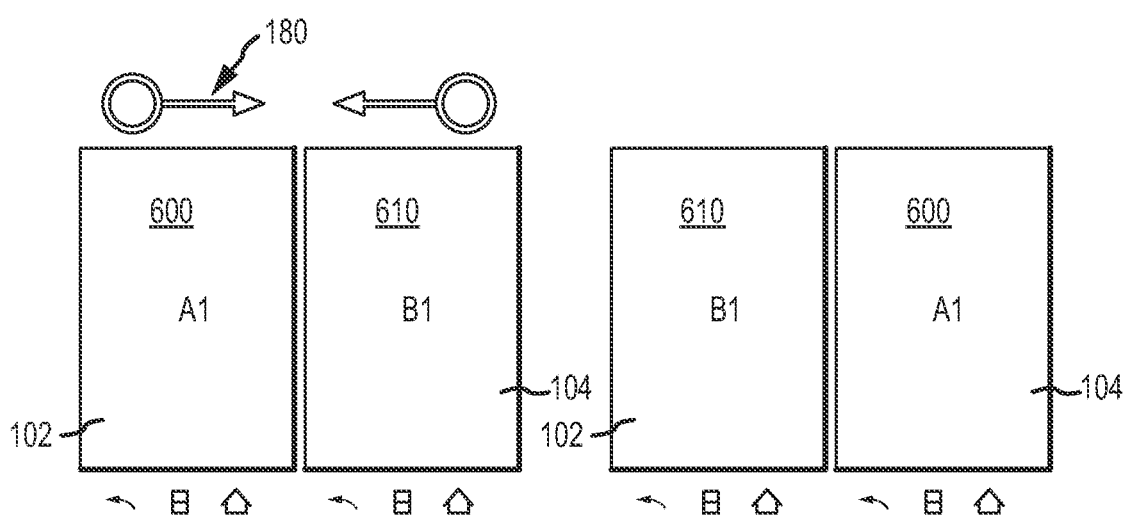
FIGS. 6A and 6B are graphical representations of another embodiment of a handheld computing device functioning in response to a gesture input to change between a first display state and a second display state.

With further reference to FIGS. 6A and 6B, a received pinch gesture 180 may also be used to swap screens displayed in a first display 102 and second display 104 wherein the screens are associated with multi screen applications executing in single screen mode. In this regard, FIG. 6A, Application A1 600 may be displayed in the first display 102 such that Application A1 600 is operating in single screen mode and is displayed in the first display 102. Also, Application B1 610 may be operating in a single screen mode and may be displayed in the second display 104. Upon receipt of the pinch gesture 180 when the device is in the configuration shown in FIG. 6A, the device may change to the display state shown in FIG. 6B. In FIG. 6B, Application A1 600 may be swapped with Application B1 610 such that Application B1 610 is displayed by the first display 102 and Application A1 600 is displayed by the first display 104.

Figures 7A, 7B:
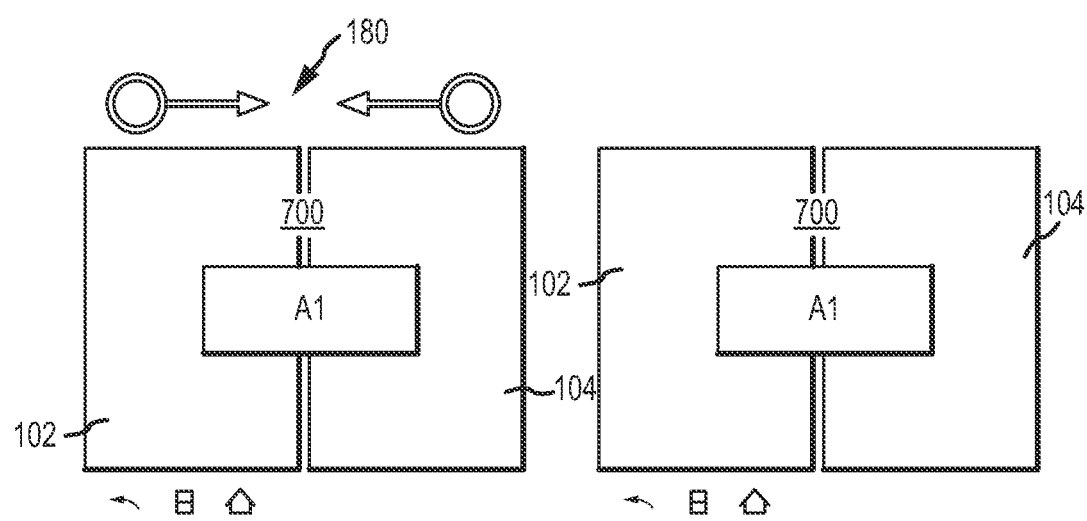
FIGS. 7A and 7B are graphical representations of an embodiment of a handheld computing device before and after receiving a gesture input.
Figures 8A, 8B:
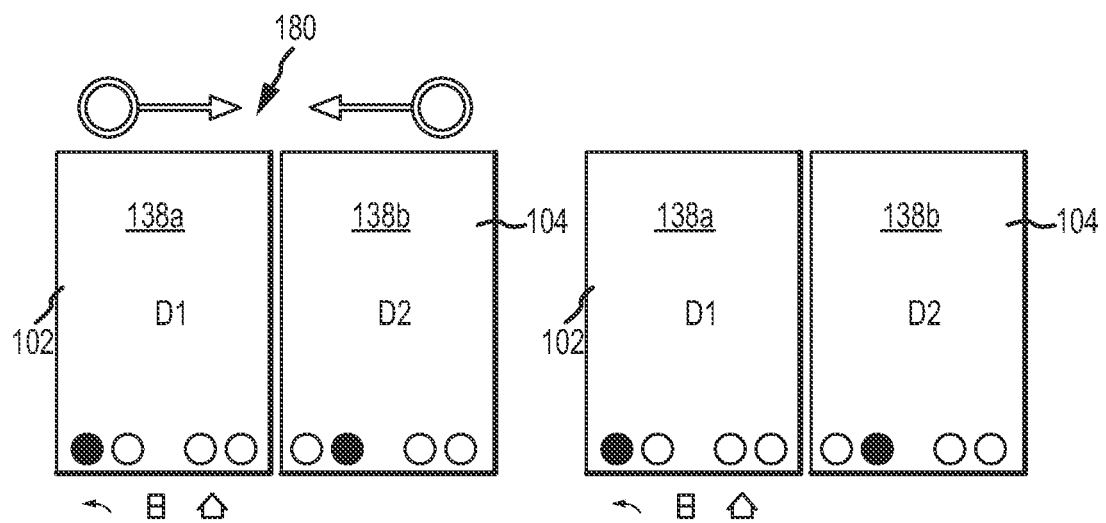
FIGS. 8A and 8B are graphical representations of another embodiment a handheld computing device before and after receiving a received gesture input.
Figure 10A:
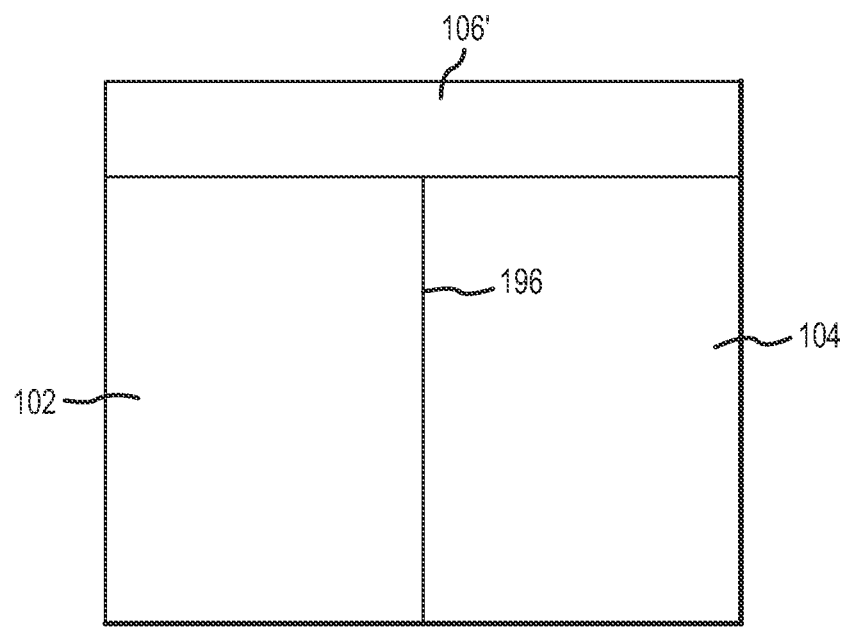
FIGS. 10A and 10B are schematic views of two embodiments of a handheld computing device provided with touch sensitive devices.
Figure 10B:
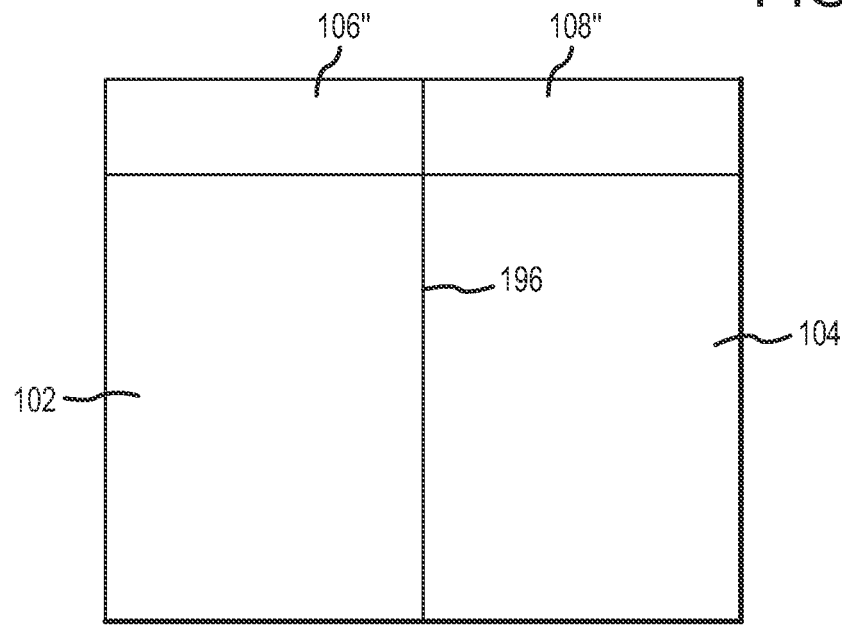

With additional reference to FIGS. 7A and 7B, Application A1 700 may be a multi screen application that is operating in multi screen mode. In this regard, Application A1 700 may occupy both the first display 102 and the second display 104. Upon receipt of a pinch gesture 180 when in the configuration shown in FIG. 7A, the device may remain unchanged as shown in FIG. 7B. That is, the receipt of the pinch gesture 180 when the Application A1 700 is in multi-screen mode may result in no change in the display state of the device. In this regard, in FIG. 7B, Application A1 700 is still displayed in both the first display 102 and the second display 104 after receipt of the pinch gesture 180. Similarly, as shown in FIGS. 8A and 8B, a first desktop screen 138a may be displayed in the first display 102 and a second desktop screen 138b may be displayed in the second display 104. Upon receipt of the pinch gesture 180 when the device is in the configuration shown in FIG. 8A, no change may occur such that the arrangement of FIG. 8A is maintained in FIG. 8B such that the first desktop screen 138a is still shown in the first display 102 and the second desktop screen 138b is still shown in the second display 104.

In contrast, as shown in FIG. 9A when a single screen of Application X 900 is displayed in the first display 102 and a desktop screen 138b is displayed in a second display 104, upon receipt of a pinch gesture 180, the device may change to a display state shown in FIG. 9B. That is, upon receipt of a pinch gesture 180 when in the configuration shown in FIG. 9A, the result may be the single screen of Application X 900 being moved to the second display 104. In this regard, a first desktop screen 138a that was previously obscured by the Application X 900 may be exposed. Additionally, the second desktop screen 138b that was previously visible in the second display 104 may be obscured. Additionally, if a second pinch gesture 180 is received when in the configuration shown in FIG. 9B, the device may be changed to a state shown in FIG. 9C, wherein Application X 900 is moved from the second display 104 to the first display 102. In this regard, the first desktop screen 138a that is visible in FIG. 9B is again obscured by Application X 900 in FIG. 9C. Additionally, the second desktop screen 138b may be exposed in FIG. 9C in the second display 104 that was previously obscured by Application X in FIG. 9B.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for controlling a plurality of displays of a handheld computing device, comprising:
    displaying a first screen in a first display of the plurality of displays when in a first display state;
    receiving a first gesture input in a first off display gesture area of the handheld computing device, wherein the first off display gesture area is associated with, but physically separate from, the first display;
    receiving a second gesture input in a second off display gesture area of the handheld computing device, wherein at least a portion of the first gesture input occurs simultaneously with at least a portion of the second gesture input, and wherein the second off display gesture area is associated with, but physically separate from, a second display;
    in response to receiving the first gesture input and the second gesture input:
    determining that the first gesture input and the second gesture input are a single pinch gesture, wherein a pinch gesture received in the first display or second display has a different function;
    determining whether the first screen comprises a screen of an application executing in a single screen mode or a multi screen mode;
    in response to the single pinch gesture and determining that the first screen comprises a screen of an application executing the single screen mode, modifying the plurality of displays from the first display state to a second display state
    wherein changing to the second display state comprises:
        displaying the first screen on the second display; and
        changing a display on the first display, wherein the change to the first display is one of:
            displaying a desktop on the first display, wherein the desktop is uncovered when the first screen moves to the second display; or
            displaying a second screen on the first display, wherein the second screen was previously displayed on the second display; and
    in response to the single pinch gesture and determining that the first screen comprises a screen of an application executing the multi screen mode, maintaining the first display state unchanged.

2. The method as recited in claim 1, wherein the first gesture input is a drag gesture in a first direction.

3. The method as recited in claim 2, wherein the second gesture input is a drag gesture in a second direction, and wherein the first direction and the second direction are opposite.

4. The method as recited in claim 1, wherein at least one of the first gesture input and second gesture input is received at a touch sensitive device.

5. The method as recited in claim 4, wherein the first display and second display are provided on a single hardware screen.

6. The method as recited in claim 1, wherein a second screen is displayed in the second display when in the first display state and the first display when in the second display state.

7. The method as recited in claim 6, wherein the first screen is associated with a first application executing on the handheld computing device and the second screen is associated with a second application executing on the handheld computing device.

8. The method as recited in claim 7, wherein at least one of the first and second applications is a single screen application.

9. The method as recited in claim 8, wherein at least one of the first and second applications is a multi screen application executing in a single screen mode.

10. The method as recited in claim 1, wherein a first desktop screen is displayed in the second display in the first display state and a second desktop screen is displayed in the first display in the second display state.

11. The method as recited in claim 1, wherein the first gesture input is a touch input received at a first touch sensitive portion of the handheld computing device and the second gesture input is a touch input received at a second touch sensitive portion of the handheld computing device.

12. The method as recited in claim 11, wherein the first touch sensitive portion is associated with the first display to comprise a first touch screen display, and wherein the second touch sensitive portion is associated with a second touch sensitive display to comprise a second touch sensitive display.

13. The method as recited in claim 11, wherein the first touch sensitive portion is disposed apart from the first display, and wherein the second touch sensitive portion is disposed apart from the second display.

14. The method as recited in claim 1, wherein the plurality of displays comprise separate portions of a single display, wherein the first display corresponds with a first portion of the single display and the second display corresponds with a second portion of the single display.

15. A handheld computing device comprising:
a processor; and
a memory coupled with and readable by the processor and storing therein a set of instructions which, when executed by the processor, causes the processor to control a plurality of displays of the handheld computing device by:
  displaying a first screen in a first display of the plurality of displays when in a first display state;
  receiving a first gesture input in a first off display gesture area of the handheld computing device, wherein the first off display gesture area is associated with, but physically separate from, the first display;
  receiving a second gesture input in a second off display gesture area of the handheld computing device, wherein at least a portion of the first gesture input occurs simultaneously with at least a portion of the second gesture input, and wherein the second off display gesture area is associated with, but physically separate from, a second display;
  in response to receiving the first gesture input and the second gesture input:
  determining that the first gesture input and the second gesture input are a single pinch gesture, wherein a pinch gesture received in the first display or second display has a different function;
  determining whether the first screen comprises a screen of an application executing in a single screen mode or a multi screen mode;
  in response to the single pinch gesture and determining that the first screen comprises a screen of an application executing the single screen mode, modifying the plurality of displays from the first display state to a second display state
  wherein changing to the second display state comprises:
    displaying the first screen on the second display; and
    changing a display on the first display, wherein the change to the first display is one of:
      displaying a desktop on the first display, wherein the desktop is uncovered when the first screen moves to the second display; or
      displaying a second screen on the first display, wherein the second screen was previously displayed on the second display; and
  in response to the single pinch gesture and determining that the first screen comprises a screen of an application executing the multi screen mode, maintaining the first display state unchanged.

16. The handheld computing device as recited in claim 15, wherein the first gesture input is a drag gesture in a first direction.

17. The handheld computing device as recited in claim 16, wherein the second gesture input is a drag gesture in a second direction, and wherein the first direction and the second direction are opposite.

18. The handheld computing device as recited in claim 15, wherein a second screen is displayed in the second display when in the first display state and the first display when in the second display state.

19. The handheld computing device as recited in claim 18, wherein the first screen is associated with a first application executing on the handheld computing device and the second screen is associated with a second application executing on the handheld computing device.

20. The handheld computing device as recited in claim 19, wherein at least one of the first and second applications is a single screen application.

21. The handheld computing device as recited in claim 20, wherein at least one of the first and second applications is a multi-screen application executing in a single screen mode.

22. A non-transitory computer-readable medium comprising a set of instructions stored therein which, when executed by a processor, causes the processor to control a plurality of displays of the handheld computing device by:
  displaying a first screen in a first display of the plurality of displays when in a first display state;
  receiving a first gesture input in a first off display gesture area of the handheld computing device, wherein the first off display gesture area is associated with, but physically separate from, the first display;
  receiving a second gesture input in a second off display gesture area of the handheld computing device, wherein at least a portion of the first gesture input occurs simultaneously with at least a portion of the second gesture input, and wherein the second off display gesture area is associated with, but physically separate from, a second display;
  in response to receiving the first gesture input and the second gesture input:
  determining that the first gesture input and the second gesture input are a single pinch gesture, wherein a pinch gesture received in the first display or second display has a different function;
  determining whether the first screen comprises a screen of an application executing in a single screen mode or a multi screen mode;
  in response to the single pinch gesture and determining that the first screen comprises a screen of an application executing the single screen mode, modifying the plurality of displays from the first display state to a second display state
  wherein changing to the second display state comprises:
    displaying the first screen on the second display; and changing a display on the first display, wherein the change to the first display is one of:
  displaying a desktop on the first display, wherein the desktop is uncovered when the first screen moves to the second display; or
  displaying a second screen on the first display, wherein the second screen was previously displayed on the second display; and
in response to the single pinch gesture and determining that the first screen comprises a screen of an application executing the multi screen mode, maintaining the first display state unchanged.

\* \* \* \* \*